US010313397B2

(12) United States Patent
Komu et al.

(10) Patent No.: US 10,313,397 B2
(45) Date of Patent: Jun. 4, 2019

(54) METHODS AND DEVICES FOR ACCESS CONTROL OF DATA FLOWS IN SOFTWARE DEFINED NETWORKING SYSTEM

(71) Applicant: Telefonaktiebolaget LM Ericsson (publ), Stockholm (SE)

(72) Inventors: Miika Komu, Helsinki (FI); Tero Kauppinen, Espoo (FI); Alireza Ranjbar, Espoo (FI); Patrik Salmela, Espoo (FI)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 0 days.

(21) Appl. No.: 15/562,030

(22) PCT Filed: Apr. 10, 2015

(86) PCT No.: PCT/SE2015/050429
§ 371 (c)(1),
(2) Date: Sep. 27, 2017

(87) PCT Pub. No.: WO2016/163927
PCT Pub. Date: Oct. 13, 2016

(65) Prior Publication Data
US 2018/0091557 A1 Mar. 29, 2018

(51) Int. Cl.
*H04L 29/06* (2006.01)
*H04L 12/851* (2013.01)

(52) U.S. Cl.
CPC .......... *H04L 63/20* (2013.01); *H04L 47/2441* (2013.01); *H04L 63/0218* (2013.01);
(Continued)

(58) Field of Classification Search
CPC ......... H04L 63/20; H04L 63/10; H04L 63/08; H04L 47/2441; H04L 63/0218; H04L 63/14
See application file for complete search history.

(56) References Cited

U.S. PATENT DOCUMENTS 7,596,097 B1 * 9/2009 McCowan .............. H04L 43/00 370/248
7,730,521 B1 * 6/2010 Thesayi ................ H04L 63/306 370/230
2002/0199098 A1 * 12/2002 Davis .................. H04L 63/0281 713/160

(Continued)

FOREIGN PATENT DOCUMENTS

WO WO 2014/034119 3/2014

OTHER PUBLICATIONS

Yu et al., "Detecting selective forwarding attacks in wireless sensor networks", Apr. 25-29, 2006, Proceedings 20th IEEE International Parallel & Distributed Processing Symposium (Year: 2006).*

(Continued)

*Primary Examiner* — Morshed Mehedi
(74) *Attorney, Agent, or Firm* — Sage Patent Group

(57) ABSTRACT

The disclosure relates to a method for access control of a data flow in a software defined networking system. The method includes receiving a first packet associated with a first data flow between a client node and a server node, verifying authentication of the first packet, repeating the receiving and verifying for a number of subsequent packets of the first data flow, wherein the number of subsequent packets is set based on type of protocol used for the first data flow and/or a policy set in the controller device, and sending, to an intermediate node along a path of the first data flow, a respective verification message for each successfully verified authentication of the first packet and any subsequent packets, allowing the first packet and any subsequent packets of the first data flow for forwarding.

19 Claims, 7 Drawing Sheets

(52) U.S. Cl.
CPC .............. *H04L 63/08* (2013.01); *H04L 63/10* (2013.01); *H04L 63/14* (2013.01)

(56) References Cited

U.S. PATENT DOCUMENTS

| | | | | | |
|---|---|---|---|---|---|
| 2003/0033401 | A1 * | 2/2003 | Poisson | H04L 12/4675 | 709/224 |
| 2006/0101261 | A1 * | 5/2006 | Lee | H04L 9/3226 | 713/153 |
| 2011/0047256 | A1 * | 2/2011 | Babu | H04L 29/12367 | 709/223 |
| 2011/0131417 | A1 * | 6/2011 | Swander | H04L 63/0823 | 713/176 |
| 2011/0208971 | A1 * | 8/2011 | Bhattacharya | H04L 9/3066 | 713/179 |
| 2013/0329738 | A1 * | 12/2013 | Yamagata | H04L 47/808 | 370/392 |
| 2015/0026794 | A1 * | 1/2015 | Zuk | H04L 63/0227 | 726/13 |

OTHER PUBLICATIONS

International Search Report and Written Opinion of the International Searching Authority, Application No. PCT/SE2015/050429, dated Nov. 13, 2015, 8 pages.
Hummen, R., "SEAMS: A Signaling Layer for End-Host-Assisted Middlebox Services," IEEE, Trust, (TrustCom), 2012 IEEE 11$^{th}$ International Conference on Trust Security and Privacy in Computing and Communications (TrustCom), Jun. 25-27, 2012, pp. 525-532.
Henderson, T. (ed.) et al., "Host Mobility With the Host Identity Protocol," RFC 5206, Jan. 12, 2015, http://draft-ietf-hib-rfc5206-bis-08, 25 pages.
Moskowitz, R. (ed.) et al., "Host Identity Protocol Version 2 (HIPv2)," RFC 7401, Apr. 2015, https://tools.ietf.org/html/rfc7401, 128 pages.
Keranen, A., et al., "Native NAT Traversal Mode for the Host Identity Protocol," HIP Working Group, Internet Draft, Jan. 22, 2015, http://draft-ietf-hip-native-nat-traversal-08, 13 pages.

* cited by examiner

METHODS AND DEVICES FOR ACCESS CONTROL OF DATA FLOWS IN SOFTWARE DEFINED NETWORKING SYSTEM

CROSS REFERENCE TO RELATED APPLICATIONS

This application is a 35 U.S.C. § 371 national stage application of PCT International Application No. PCT/SE2015/050429 filed on Apr. 10, 2015, the disclosure and content of which is incorporated by reference herein in its entirety.

TECHNICAL FIELD

The technology disclosed herein relates generally to the field of data networks, and in particular to methods for access control of a data flow in software defined networking system, to a controller device, intermediate nodes, computer programs and computer program products.

BACKGROUND

Various techniques exist to achieve an end-to-end security between two communicating endpoints, e.g. a client node and a server node. When one, or both, of the communicating endpoints reside in a datacenter the communication path between them comprises a number of network elements, in particular intermediate nodes (e.g. switches, routers, gateways and other middleboxes) that are part of the datacenter's network. Some of the data flows destined to e.g. public web services do not use any security or authentication at all, and the intermediate nodes allow such flows to pass through. However, some data flows, particularly destined to critical services are authenticated, for instance based on public-key technology. The authentication often occurs at the endpoints that terminate the connection, but sometimes also the intermediate nodes are involved in the authentication process.

As an example of a purely end-to-end authentication, Secure Shell (SSH) protocol is used to establish a terminal session or file transfer session from a client to a server. As an example of an end-to-middle authentication, web-based authentication is typically separated from the actual web service in protocols such as OAuth (an open standard for authorization) providing a delegated access, or Shibboleth. In such a case, the host responsible of the authentication, an Identity Provider (IdP), is located off the communications path between the client and the server.

Virtual Private Network (VPN) services are also implemented using end-to-middle authentication, but in this case the authentication middlebox, a VPN gateway, is always located on the communication path between the client and server because it terminates the security tunnel between the client and VPN gateway.

Firewalls may be used as an alternative or complement to the various security mechanisms. Firewalls filter packets based on location-dependent identifiers at the lower layers, typically based on Internet Protocol (IP) addresses. For instance, a firewall may allow only certain IP address ranges to thereby control the access to a service. Firewall-like functionality may also be included in switches, for instance, a switch may be firewalled so that only specific Media Access Control (MAC) addresses are allowed to pass through its ports. Alternatively, such functionality can be implemented at switches or routers by isolating different ports of a switch from each other using Virtual LAN (VLAN) tags, hence allowing traffic only to/from certain ports. It should be noted that the switches and other intermediate nodes are not necessarily physical devices, but can be virtualized, especially in datacenters.

In order to enable communication between endpoints, the intermediate nodes need to allow and forward network traffic between the endpoints. A number of protocols for automating the configuration of intermediate nodes, e.g. middleboxes, exist, such as Universal Plug and Play (UPnP), Open Shortest Path First (OSPF), Border Gateway Protocol (BGP), Simple Network Management Protocol (SNMP), Network Configuration Protocol (Netconf), Path Computation Element Communication Protocol (PCEP) and Open vSwitch Database Management Protocol (OVSDB).

Software Defined Networking (SDN) is a paradigm that decouples network control (using a control plane) from forwarding functions (realized by a data plane). This paradigm hence requires a way for the control plane to communicate with the data plane. As an example of such a way, OpenFlow protocol support logically centralized control of intermediate nodes (i.e. middleboxes). The OpenFlow protocol can be used to determine a dynamic path of network packets through the network, and to enforce access control at the intermediate nodes.

Hardware-based intermediate nodes, such as switches and routers, located in a datacenter have little or no means to protect their services against unauthorized access or Distributed Denial of Service (DDoS) attacks. The services have to protect themselves because legacy intermediate nodes offer only coarse-grained methods to protect the services, such as for instance the mentioned examples of allowing only certain transport-layer ports, IP addresses or ranges, MAC addresses or VLAN tags. However, these methods are usually bound to location-based identifiers, which makes them inconvenient in for instance scenarios involving mobile clients or services that migrate between different networks. In particular, the mobile client (or server) will obtain a new identifier for each visited location, and the intermediate nodes are not aware of these identifiers. Any preconfigured rules will then not match the identity of the mobile client (or mobile server).

Cost-efficient, physical commodity intermediate nodes (e.g. middleboxes) do not usually inspect application-layer traffic because such Deep Packet Inspection (DPI) requires specialized hardware in order to avoid degraded performance. On the other hand, specialized hardware and virtualized intermediate nodes (e.g. middleboxes) can support DPI to inspect network traffic. In such a case, the intermediate nodes (e.g. middleboxes) usually mirror the traffic to a logically centralized collection point. A challenge in this regard is that the amount of traffic can be overly large and intelligent strategies are needed to find the essential information in real time.

SUMMARY

An objective of the present disclosure is to solve or at least alleviate at least one of the above mentioned problems.

The objective is, according to a first aspect, achieved by a method for access control of a data flow in a software defined networking system. The method is performed in a controller device and comprises receiving, from an intermediate node, a first packet associated with a first data flow between a client node and a server node; verifying, based on flow attributes of the first packet, authentication of the first packet; repeating the receiving and verifying for a number of subsequent packets of the first data flow, wherein the number of subsequent packets is set based on type of protocol used for the first data flow and/or a policy set in the controller device; and sending, to an intermediate node along a path of the first data flow, a respective verification message for each successfully verified authentication of the first packet and any subsequent packets, allowing the first packet and any subsequent packets of the first data flow for forwarding.

The method provides a more fine-grained solution for access control based on intermediate nodes compared to known security measures. The method introduces resiliency against attacks, such as DDoS attacks, since unauthorized data flows are dropped early, in particular at the edge nodes of the software defined networking system. Further, since the intermediate node will only comprise state information for authenticated flows, the amount of state information is reduced.

The objective is, according to another aspect, achieved by a computer program for a controller device for access control of a data flow. The computer comprises computer program code, which, when executed on at least one processor on the controller device causes the controller device to perform the method as above.

The objective is, according to an aspect, achieved by a computer program product comprising a computer program as above and a computer readable means on which the computer program is stored.

The objective is, according to an aspect, achieved by a controller device for access control of a data flow in a software defined networking system. The controller device is configured to: receive, from an intermediate node, a first packet associated with a first data flow between a client node and a server node; verify, based on flow attributes of the first packet, authentication of the first packet; repeat the receiving and verifying for a number of subsequent packets of the first data flow, wherein the number of subsequent packets is set based on type of protocol used for the first data flow and/or a policy set in the controller device; and send, to an intermediate node along a path of the first data flow, a respective verification message for each successfully verified authentication of the first packet and any subsequent packets, allowing the first packet and any subsequent packets of the first data flow for forwarding.

The objective is, according to an aspect, achieved by a method for authenticating a data flow in a software defined networking system. The method is performed in an intermediate node and comprises: receiving from a first endpoint node, a first data flow addressed to a second endpoint node; diverting, to a controller device, a first packet for an authentication verification, the first packet being associated with the first data flow; receiving, from the controller device, a first verification message in case of successfully verifying authentication of the first packet; receiving, from the second endpoint node, a second packet sent in response to the first packet; diverting, to the controller device, the second packet for an authentication verification; receiving, from the controller device, a second verification message verifying authentication of the second packet.

The first data flow may hence be authenticated in both directions of a communication path, i.e. in the direction from the first endpoint to the second endpoint, as well as the reverse direction from the second endpoint to the first endpoint. The intermediate node may be preconfigured to perform the diverting. To have all intermediate nodes diverting packets for authentication to a centralized controller device enables a cost-efficient operation and maintenance of the software defined networking system.

The objective is, according to an aspect, achieved by a computer program for an intermediate node for authenticating a data flow. The computer program comprises computer program code, which, when executed on at least one processor on the intermediate node causes the intermediate node to perform the method as above.

The objective is, according to an aspect, achieved by a computer program product comprising a computer program as above and a computer readable means on which the computer program is stored.

The objective is, according to an aspect, achieved by an intermediate node for authenticating a data flow in a software defined networking system. The intermediate node is configured to: receive from a first endpoint node, a first data flow addressed to a second endpoint node; divert, to a controller device, a first packet for an authentication verification, the first packet being associated with the first data flow; receive, from the controller device, a first verification message in case of successfully verifying authentication of the first packet; receive, from the second endpoint node, a second packet sent in response to the first packet, divert, to the controller device, the second packet for an authentication verification; receive, from the controller device, a second verification message verifying authentication of the second packet.

Further features and advantages of the present disclosure will become clear upon reading the following description and the accompanying drawings.

DETAILED DESCRIPTION

Figure 1:
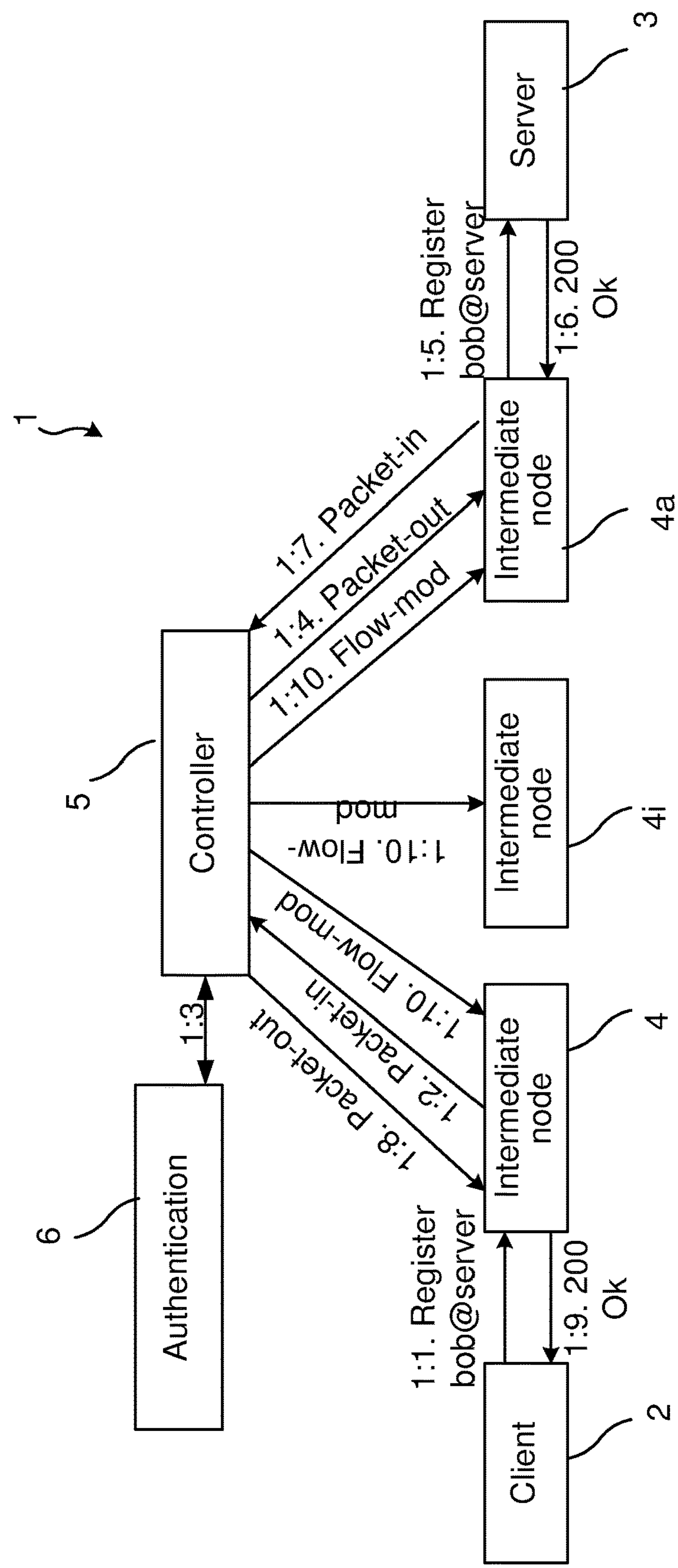
FIG. 1 illustrates schematically an environment in which embodiments of the present teachings may be implemented.

In the following description, for purposes of explanation and not limitation, specific details are set forth such as particular architectures, protocols, interfaces, techniques, etc. in order to provide a thorough understanding. In other instances, detailed descriptions of well-known devices, circuits, protocols and methods are omitted so as not to obscure the description with unnecessary detail. Same reference numerals refer to same or similar elements throughout the description.

As an initial note on terminology it is noted that the terms "intermediate node/device" (or "intermediary node/device") and "middlebox" may be used interchangeably herein. A middlebox may be defined as any intermediate device performing functions other than standard functions of a router of a data path between a source node and a destination node.

The middlebox may be a device that somehow affects a packet, e.g. a device that terminates one packet flow and originates another, or a device that transforms or diverts a packet flow in some way, or any combination thereof.

Briefly, in contrast to legacy SDN controllers, which perform access control for flows based e.g. on IP addresses and ports, the present teachings improve the access control by inspecting, for instance, control signaling between two communicating endpoints and an access decision is made based on information exchanged between the endpoints. The information that can be used for performing access control and other policy decisions may, for instance, be based on endpoint identifiers, usernames and passwords, certificates, negotiated session parameters and handshake result. It is noted that the present teachings are not limited to the use cases used for exemplifying and illustrating aspects, i.e. the shown applicability for SIP, SSL/TLS and Host Identity Protocol, and that other protocols may benefit from the present teachings as well.

The present teachings bring about various technical effects and advantages. For instance, a more fine-grained solution for middlebox based access control is provided as compared to traditional measures. Some resiliency against DDoS attacks is introduced because unauthorized data flows are dropped early on during communications at the edge of the network. The amount of state information from the intermediate nodes, e.g. middleboxes, can be reduced because the middleboxes will, in some embodiments, contain state information only for authenticated data flows. Various aspects of the teachings can be realized not only in high-end switches, but even on commodity switches that support e.g. OpenFlow version 1.0. Further, the teachings are applicable for monitoring both incoming and outgoing traffic at the middleboxes, e.g., from the server to the client as well as from the client to the server. Further still, location dependent access control methods can be avoided, thereby rendering authentication more suitable for environments where the client side is mobile or where services may migrate between different networks and/or different radio access technologies. In some embodiments, the controller is hindered from becoming the bottleneck for the protocols being inspected by having the controller only verifying the handshake of the associated protocol data flows. By virtue of the controller being centralized and handling all inspection and/or authentication of data flows, asymmetric routes can be handled, where the ingress and egress data flows pass through a different set of middleboxes. The teachings are applicable to various protocols, and will be exemplified in the following by three protocols: Session Initiation Protocol (SIP), Secure Sockets Layer/Transport Layer Security (SSL/TLS) and Host Identity Protocol (HIP).

FIG. 1 illustrates a schematic view of a Software Defined Networking (SDN) environment, in the following denoted software defined networking system 1, or SDN system 1. In the software defined networking, network control made by a control plane is decoupled from forwarding functions made by a data plane, as mentioned earlier, and a way for the control plane to communicate with the data plane is hence needed. Further, in the SDN architecture, network intelligence and state are logically centralized and the underlying network infrastructure is abstracted from the applications.

As also mentioned, an OpenFlow protocol supports logically centralized control of intermediate nodes. That is, a centralized management is supported, although the centralization is to be understood as conceptual, and that the control may nevertheless be implemented on multiple nodes. Centralized control (management) is an efficient way of obtaining overall control of the entire SDN system 1.

The SDN system 1, comprising e.g., a datacenter network, comprises a number of nodes and devices providing a communication path enabling endpoint nodes, in the FIG. 1 represented by a client 2 and a server 3, to communicate. The client 2 may for instance comprise any hardware or software able to access a service provided by the server 3. For instance, the client may comprise or be installed in a user device, such as a laptop, a wireless device, a mobile terminal, a smart phone etc. The server 3 may for instance comprise a server of a packet data network, such as Internet. It is noted that the server 3 may comprise a virtual machine (software implementation of a server), and multiple servers may thus run within a single (hardware) server. The server 3 may be arranged to handle service requests from clients, e.g. capable of receiving, handling and acting on service requests from the client 2. Such requests from the client 2 may pass one or several intermediate nodes 4, **4*i*, 4*a* of the SDN 1 before reaching the server 3. The server 3 may also initiate communication to the client 2. It is also noted in this context that a "client" is the initiator of a connection, and may thus be a server initiating communication with another server. Such server-to-server communications are commonly occurring in data centers, where, e.g., a web server communicates with another server. Both servers may be located in the same data center and be controlled by a single controller device 5**, or they may be located in different data centers (and then in most cases be controlled by different controllers).

The intermediate nodes 4, **4*i*, 4*a*** may for instance comprise switches, routers, gateways, and any other type of middleboxes.

In an aspect of the present teachings, an improved end-to-middle authentication is provided, and security in the intermediate nodes is increased by use of a controller device 5, e.g., in improved means for protection against DDoS attacks.

The SDN system 1 comprises a controller device 5 arranged to authenticate data flows within the SDN system 1. The present teachings provide, in different aspects, a solution where the controller device 5 is a logically centralized network controller, e.g. an OpenFlow controller (i.e. a controller implementing the OpenFlow protocol). The controller device 5 handles (manages) a number of intermediate nodes 4, **4*i*, 4*a* and is part of the functionality capable of handling the authentication process of data flows in the SDN system 1**.

In some embodiments, the intermediate nodes 4, **4*i*, 4*a* may be arranged to, by default, divert all packets associated to new data flows through the controller device 5, which approves each packet separately. To avoid the (logically centralized) controller device 5 from becoming a bottleneck for communications, in some embodiments only specified protocols are verified by the controller device 5. Further, the controller device 5 may be arranged to verify only a certain number of packets of the data flow, preferably packets from the beginning of the data flow. Verifying packets from the initial part of the data flow is advantageous since different protocols may start the communication with an authenticating handshake before transmitting any application payload, and packets of e.g. such authenticating handshake are good candidates for authentication verification. The controller device 5 may then, in some embodiments, inspect only this part of the data flow (i.e. the data flow relating to the authenticating handshake). After successfully inspecting such authenticating handshake, the controller device 5 may instruct the intermediate nodes 4, 4*i*, 4*a* to accept further packets associated with the data flow without further need to divert packets through the controller device 5. This way, the controller device 5 can be involved in the authentication process of a data flow and it can terminate new unauthorized data flows as early as possible during the authentication process at the edge of the SDN system 1**.

The controller device 5 may be arranged to make decisions on data flows by itself, but in the environment illustrated in FIG. 1, an authentication function 6 (also denoted authentication service 6) is logically decoupled from the controller device 5.

FIG. 1 also shows an exemplary data flow from the client 2 to the server 3 according to an aspect of the present teachings, which will be described later, in relation to FIG. 3.

Figure 2:
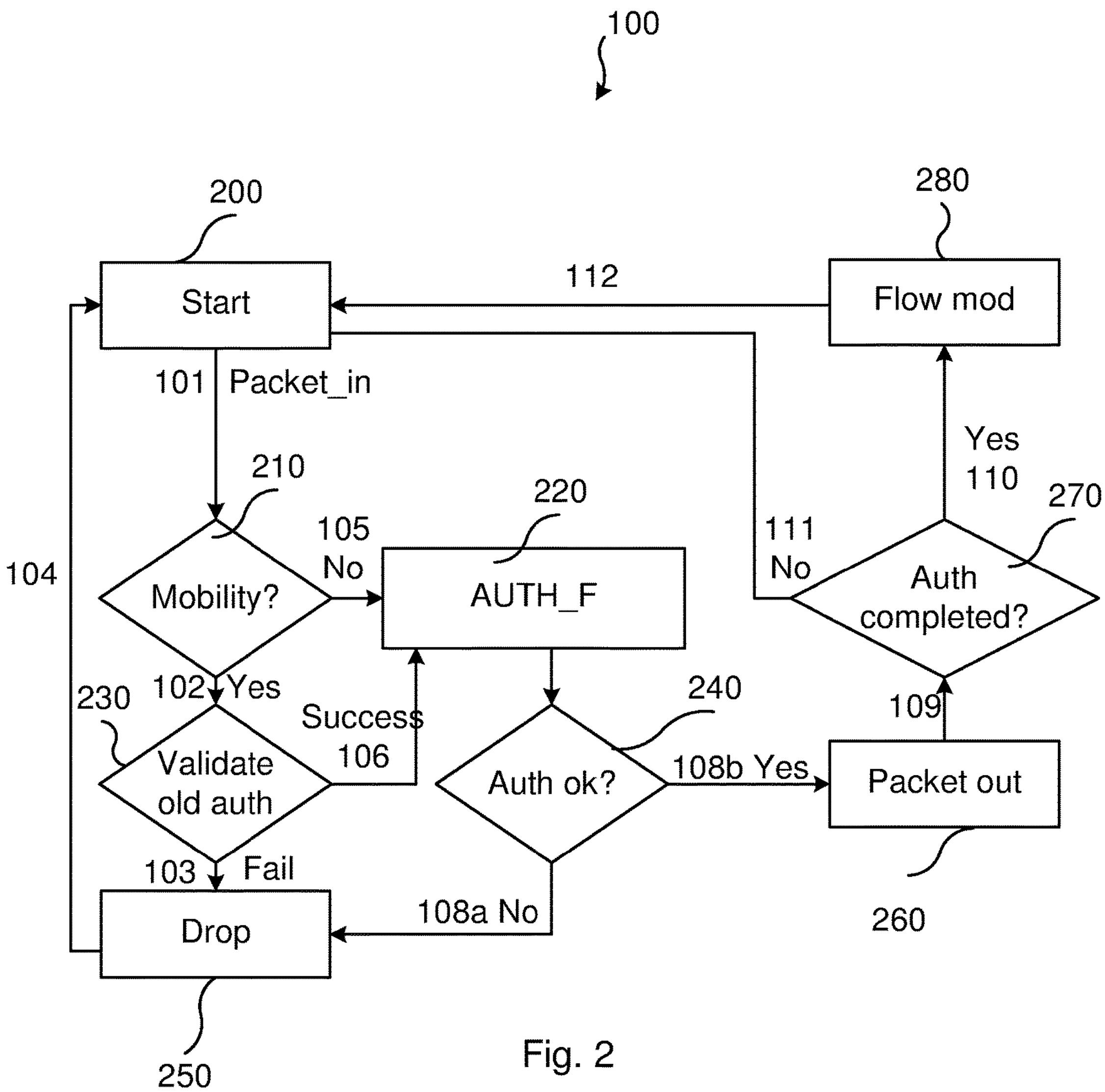
FIG. 2 is a flow chart showing embodiments of the present teachings.

FIG. 2 is a flow chart showing embodiments of the present teachings. In particular, a flow 100 in the controller device 5 is illustrated in form of a state machine. In box 200 (indicated as "Start"), the controller device 5 is in a state in which it listens for or awaits incoming packets. When an intermediate node receives a packet, it sends a packet-in message to the controller device 5 thus sending the captured packet to the controller device 5. When receiving the packet (arrow 101, "packet-in"), the controller device 5 transitions to state "Mobility?" (box 210), wherein it investigates any mobility scenario for the packet and/or data flow to which the packet belongs.

The controller device 5 maintains a state of flows and information on when they are going to expire. When the controller device 5 receives a packet relating to a new data flow it may thus check if it is related to an already existing session between two communicating endpoints. This check may be done in different ways, depending e.g. on the protocol at hand. For HIP, the controller device 5 may check the source and destination Host Identity Tags (HITs) of mobility-related control messages. For plain-text SIP, there are mobility-related extensions that include Uniform resource identifiers (URIs) as coarse-grained identifiers, but a SIP call-id would serve as a more fine-grained identifier. As yet another particular example on the mobility check, TLS includes so-called resumed handshake, and a TLS session resumption check could be ticket based or based on a session id. For ticket based resumption, there is (as the name suggests) a ticket being exchanged during a TLS handshake that can later on be provided by the client to the server in order to resume the previous session. Thus, the ticket can be recorded and used for identifying resumed sessions. When the ticket is a large data blob (large binary object), the controller device 5 might store the ticket or store a hash value of the ticket and then compare it to tickets communicated in new TLS communication. Regular session resumption is based on the client providing the session id of the session it wants to resume. This is also communicated both in regular and resumed TLS negotiations.

If the mobility check of box 210 reveals that no mobility is dealt with, i.e. that this packet is not part of a flow between parties that already have a session set up, then flow state transitions to box 220 (arrow 105, "No"). In this state, the packet is verified by an authentication function, denoted "AUTH_F" in the figure. The authentication function may be different for different protocols, i.e. a specific authentication method may be applied in dependence on the protocol used for the packet. Examples of such authentication functions comprise certificate verification, identity verification and authorization, and verification of protocol parameters.

If the mobility check of box 210 reveals that this is a case of mobility, then flow continues to box 230 (arrow 102, "Yes"), wherein the controller device 5 validates an old authentication, i.e. checks that a base exchange has already been run between the communicating endpoints. If this check fails, i.e., the base exchange has not been run, then flow continues to box 250 (arrow 103, "Fail"), wherein the packet is dropped, and the controller device 5 informs an intermediate node that the corresponding flow to which the packet belongs should be dropped.

This intermediate node may be the node from which the controller received the packet, or it could be a different intermediate node along the path between the communicating endpoints. The controller device 5 then returns to the initial state, i.e. "Start" (box 200). If, on the other hand, the check of box 230 reveals that a base exchange has already been run and there is a need to validate the old authentication, then flow continues to box 220 (arrow 106, "Success"), wherein the packet is authenticated as described above. It is noted that even if the packet belongs to a data flow between endpoints which already has an ongoing session, the check of the new flow may be treated differently than how any previous data flow was authenticated. For instance, a different number of packets of the flow may be inspected.

In this context it is noted that e.g. an endpoint from the Internet may move into the SDN system 1, e.g. a virtual machine (constituting the server node) may move from a public cloud to the SDN system 1, e.g. a so called "hybrid cloud" or "multi cloud" scenario. Such endpoint may then run e.g. an HIP update. In such a case the controller device 5 will not have an existing state, although the HIP update may still be valid. The controller device 5 may be arranged to allow an UPDATE exchange without there being a prior base exchange.

From box 220, flow continues to box 240: if the authentication was successfully verified, then flow continues to box 260 (arrow **108*b*, "Yes"), else flow continues to box 250 (arrow 108*a***, "No") and the packet is dropped (the data flow denied).

In box 260 and box 270 ("Authentication completed?") the controller device 5 approves either the individual packet, or the entire data flow, and informs an intermediate node which should be informed about this accordingly by injecting a "Packet-out" message to the intermediate node. The intermediate node to be informed may be the node from which it received the packet, or it may be another intermediate node along the path between the endpoints. In box 270, it is determined if the authentication is completed or if further packets of the data flow should be authenticated. If not completed, i.e. more packets should be authenticated, then flow continues to (arrow in, "No") box 200, where the flow starts anew for another packet of the data flow. If the authentication is completed, flow continues to box 280, "Flow mod", wherein the entire data flow to which the latest checked packet belongs is allowed, and one or more intermediate nodes informed accordingly.

Figure 3:
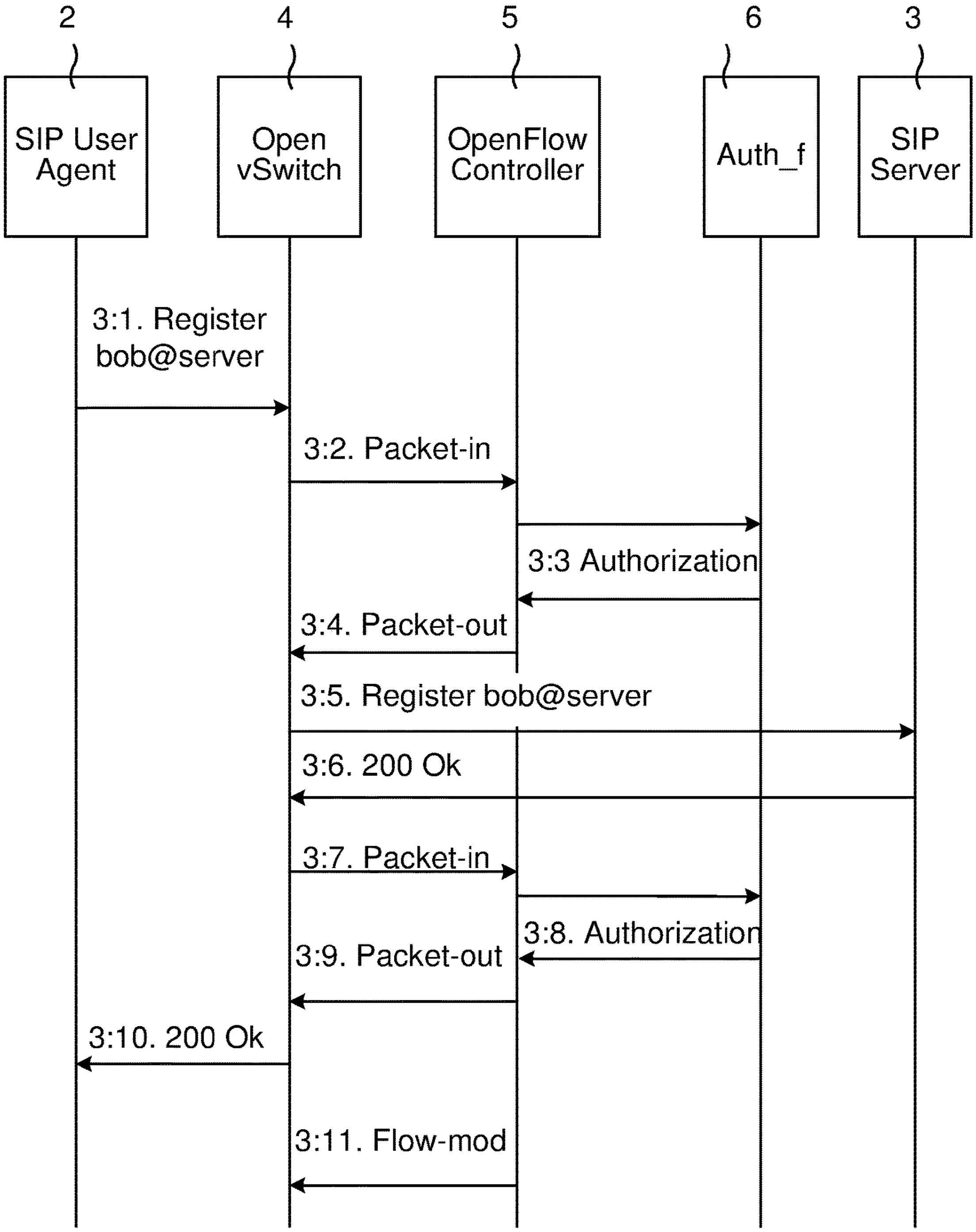
FIG. 3 is a sequence diagram illustrating an embodiment in SIP and OpenFlow.

FIG. 3 illustrates aspects of the present teachings by an embodiment based on SIP and OpenFlow. As mentioned earlier, OpenFlow is a communication protocol that supports logically centralized control of intermediate nodes (e.g. middleboxes) by giving access to the forwarding plane of the intermediate nodes. The endpoints of the communication path for a data flow are a SIP user agent 2 and a SIP server 3 in the illustrated case. One intermediate node 4 on the messaging path comprises a virtual switch 4 (denoted "switch 4" in the following, and "Open vSwitch" in the figure) based on Open vSwitch. The switch 4 communicates with an OpenFlow controller device 5 (denoted "controller device 5" in the following, and "OpenFlow controller in the figure) to inquire if new flows are acceptable. The controller device 5 may make decisions on data flows by itself, but, in the illustrated case, an authentication function is logically decoupled from the controller device 5 to an Auth_f service 6 (as described with reference to FIG. 1). Such authentication function may, as mentioned earlier, be protocol specific. By default, the switch 4 may in some embodiments be programmed proactively to send the first packet of every SIP data flow to the controller device 5 for making decision about the data flow. In other embodiments, the switch 4 may, for instance, send the first 5, 10, 20 or 50 packets, depending on the particular protocol at hand. This identification of protocol can be based on the known Transmission Control Protocol (TCP) and User Datagram Protocol (UDP) ports reserved for SIP. The switch 4 caches the arrived packets, or relies on retransmissions, and asks the controller device 5 to approve the data flow. The controller device 5 hence receives the first packet of a SIP data flow and decides about the action for the flow.

In FIG. 3, the SIP user agent 2 initiates a registration to the SIP server 3. In particular, at arrow 3:1, the SIP user agent 2 registers a user called "bob@server" to the SIP server 3, and a registration message may be sent in plain text. In other embodiments (not using SIP), such identifier is not sent in plain text and may instead be encrypted. The initiating packet of the data flow reaches the switch 4 that has been configured to send one or more packets of a SIP data flow to the controller device 5.

At arrow 3:2, the switch 4 forwards a corresponding packet to the controller device 5 (Packet-in event).

At arrows 3:3, the controller device 5 checks, e.g. from the Auth_f service 6, whether the user "bob@server" is authorized to access the SIP server 3. This check entails an inquiry message from the controller device 5 to the Auth_f service 6 and a response message from the Auth_f service 6 to the controller device 5.

The Auth_f service 6 may be configured to perform the check in any known manner, for instance, based on some network internal policies or by using a database to look up the authorization of the user.

In this case, the checks reveals that the user is indeed authorized, and at arrow 3:4, the controller device 5 sends a packet-out message to the switch 4, i.e. forwards the packet to the switch 4. It is noted that in FIG. 3, only one switch is illustrated, and that if the environment comprises several switches (which is typically the case), e.g. as illustrated in FIG. 1, the packet-out message would typically be sent to switch 4*a*, i.e. the switch closest to the server 3. At arrow 3:5, the switch 4 forwards the registration packet to the SIP server 3 (or switch 4*a* for the example illustrated in FIG. 1). The SIP server 3 may send a standard message in response to the packet, e.g. by sending a "200 ok" message, which is a standard response used for successful Hypertext Transfer Protocol (HTTP) requests, as indicated by arrow 3:6.

At arrow 3:6, the SIP server 3 thus acknowledges the successful registration message (in the illustrated case by a "200 ok" message) and this response packet is intercepted by the switch 4.

At arrow 3:7, the switch 4 again queries the controller device 5, this time about the response packet from the SIP server 3. That is, the switch 4 may check packets of a data flow in both directions: a packet in the direction from the SIP user agent 2 (arrow 3:2) and a packet in the direction from the SIP server 3 (arrow 3:7). In the example illustrated in FIG. 1, the switch 4*a* closest to the SIP server 3 would be doing this query.

At arrows 3:8, the controller device 5 does the authorization check with the Auth_f service 6.

At arrow 3:9, the controller device 5 verifies the received message and sends a packet-out to the switch 4.

At arrow 3:10, the switch 4 forwards the acknowledgement message from the SIP server 3 to the SIP user agent 2.

At arrow 3:11, the controller 5 may install one or more rules on the switch 4 by means of a flow-mod message. The rule(s) may for instance state that the switch 4 should accept the verified SIP data flow from the local inbound switch port to the local outbound switch that leads to the SIP server 3. For the case illustrated in FIG. 1, the rules would be installed in each intermediate node 4*i*, 4*a* along the path between the SIP user agent 2 and SIP server 3. From this point onwards, the packets between the SIP user agent 2 and the SIP server 3 do not require further intervention from the controller 5 because it has now approved the entire flow.

In an embodiment, the verification of a data flow ends at the reception of the verification message from the controller device 5, that the data flow is indeed authenticated, e.g. by the authentication of the user (see arrows 3:3 of FIG. 3). That is, the flow mod message may, in some embodiments, be sent already after this first authentication verification.

In another embodiment, the verification of a data flow performed in the switch 4 entails both the above first verification as well as the second verification, wherein the switch 4 checks with the controller device 5 that the acknowledgment message (arrow 3:6, FIG. 3) that it received from the server 3 is authenticated. That is, in such embodiment the verification entails verifying the data flow in both directions: first verification in the direction from the client 2 to the server 3 (arrows 3:3 of FIG. 3), and a second verification in the direction from the server 3 to the client 2 (arrows 3:8 of FIG. 3)

The teachings described with reference to FIG. 3 are applicable to other protocols as well (also including tunneling protocols) that discloses its identifiers in plaintext. For encrypted identifiers (e.g. in SSH or in some VPNs), key escrowing is needed. Essentially, key escrowing means that the server side discloses the used encryption keys to the controller device 5. It is noted that identifiers by themselves can be based on cryptography. For instance, the identifiers could be public keys in which case the controller device 5 may have to verify also the signatures with the public key. Moreover, the illustrated example of FIG. 3 for SIP is based on forwarding the first packet from the user agent to the controller device 5 for verification thereof. However, the number of forwarded packets to the controller device 5 may, as mentioned earlier, depend on the protocol. As also mentioned, the controller device 5 may receive the first packet by default, and if it, after having verified the first packet, needs a second packet, then it can request the switch 4 to forward the next packet in the buffer to the controller device 5. This process may continue until the controller device 5 has received an adequate number of packets and acknowledgements, after which the flow mod message(s) is (are) sent (arrow 3:11). It is noted that the reply message (the "200 ok") may also be checked. The teachings are hence adaptable to different protocols, and the level of security may thereby also be adapted according to need by defining how many packets of a data flow to verify.

Certain protocols may include mobility mechanisms (also described earlier with reference to FIG. 2), so that the client or server side endpoint changes their topological location in the network 1, but the endpoints sustain their connectivity. The inspection of the data flow is protocol specific and the controller device 5 needs to be aware of such protocol details. Thus, also mobility management signaling may be directed to the controller device 5 for verification about if the (moved) connection is accepted by the controller device 5, in a similar way as the initial messages of the connection might have been when the connection was set up. This may for instance be done by maintaining information in the controller device 5 about accepted connections and, if available, by using end point identifiers or connection identifiers that are used in mobility signaling for mapping the moved connection to an already accepted one.

It is noted that the type of controller device 5 is not limited to controllers configured with OpenFlow protocol, and any other protocol based on logically centralized control of data flows would suffice. If OpenFlow protocol is utilized, the approach is applicable for the OpenFlow 1.0 protocol as well as later versions thereof and also for so called southbound protocols (e.g. Network Configuration Protocol, NETCONF, Locator/ID Separation Protocol, LISP, etc.) since the controller device 5 is then responsible for deep packet inspection. It is noted that the protocol used to disseminate the identifiers between the SIP server 3 and the Auth_f service 6 is out of scope of the present disclosure.

When the controller device 5 accepts a flow for an intermediate node, e.g., for the switch 4, it may also communicate a timeout value, at the expiration of which the current data flow state at the switch 4 is expired. A data flow may for instance be "IDLE", "READY" or "RUNNING". When the corresponding data flow is idle for the time period specified by the timeout value, the switch 4 removes the associated state. After the state being removed, any subsequent data flows between the same endpoints 2, 3 again require intervention by the controller device 5. This way, the controller device 5 does not need to expire states at the intermediate nodes, but this instead occurs automatically.

Sometimes the route from the client 2 to the server 3 may be different than the reverse route. In the case of such asymmetric routes, the data flows may pass through a different set of intermediate nodes in one direction (e.g. client 2 to server 3) than in the opposite direction (e.g. server 3 to client 2). The logically centralized controller device 5 has a global view on its network 1 and its various devices and may thereby combine information from different intermediate nodes 4. After the protocol authentication phase, it can allow the associated flows properly in the ingress and egress intermediate nodes 4 as well as in other nodes along the path(s) between the communicating nodes. The flows may be allowed by means of the flow mod rules as have been described. It is noted that this is a feature applicable only for a logically centralized controller device.

As a potential (D)DoS attack against the controller device 5 itself, an attacker could try to flood the SDN system 1 with bogus packets. The intermediate node at the edge of the SDN system 1 and the controller device 5 are more likely to be affected by this type of attack. As a countermeasure, the controller device 5 may be distributed internally as opposed to implementing the controller device 5 as a single entity and also a rate limiting feature may be implemented in the intermediate node at the edge of the network 1. A distributed controller device 5 may be seen as multiple controllers to which packets are sent from switches, the distributed controller device 5 hence enabling load balancing. Further, individual controller instances may be dedicated to specific flows, e.g. sending potential DDoS flows to one or a few controller devices while keeping at least one controller device to handle flows deemed more safe. Further, a virtualized controller device may be granted more resources, or additional controller instances can be invoked. Rate limiting flows ensures that the controller device does not get more packets than it can handle.

Alternatively, the controller device 5 and the intermediate node 4 may throttle the Quality of Service (QoS) of new, unverified data flows by giving them a lower priority than verified data flows, i.e. they may be configured to control the rate of packets associated to new data flows. This way, at least the existing data flows may be kept alive.

While the example of FIG. 3 is based on unicasting, the approach applies also to multicasting. As an example, a multimedia stream could be produced by a single endpoint and consumed by multiple other endpoints. In multicast, the producer delivers a single data flow through intermediate nodes and the flow is split by the intermediate nodes only when it is necessary in order to save network bandwidth. In such a scenario, it is more advantageous to place the controller device 5 near the producer to avoid processing the data flows redundantly.

Reference is made again to FIG. 1, wherein the message exchanges corresponding to the ones illustrated in and described with reference to FIG. 3 are illustrated. Arrows 3:1-3:10 of FIG. 3 are shown as sent along a data path in the exemplary environment and set-up of FIG. 1. While there is only a single intermediate node 4 (exemplified by Open vSwitch) shown in FIG. 3 for simplicity, FIG. 1 comprises a number of intermediate nodes 4, 4*i*, 4*a*. When there are more than one intermediate nodes 4, 4*i*, 4*a* (e.g. switches) between the client 2 and the server 3, the first intermediate node 4 receiving a packet from a client may forward the packet to the controller device 5, which validates the packet (using the Auth_f function 6) and then forwards it to the last intermediate node 4*a* on the data path between the client 2 to the server 3, bypassing all other intermediate nodes on the path (in the illustrated case bypassing intermediate node 4*i*). The same is true for the reverse direction, i.e. a communication initiated by the server 3 towards the client 2: the first intermediate node 4*a* receiving a packet from the server 3 will forward the packet to the controller device 5, which validates the packet and forwards it to the last intermediate node 4 on the path between the server 3 and the client 2. By means of this, the controller device 5 does not need to install per packet rules in the intermediate nodes 4*i* on the data path between the server 3 and the client 2. The controller device 5 may bypass subsequent intermediate nodes to avoid that each of them triggers the process of validating packets redundantly. The controller device 5 may send a "packet-out" to the last intermediate node along the path (in the illustrated case intermediate nodes 4 and 4*a*) to enforce it to inject the packet without further interaction from the controller device 5.

It is noted that although the exemplary packets and messages described and illustrated with reference to FIG. 1 relate to SIP, the teachings are applicable to other protocols as well, as mentioned earlier.

Figure 4:
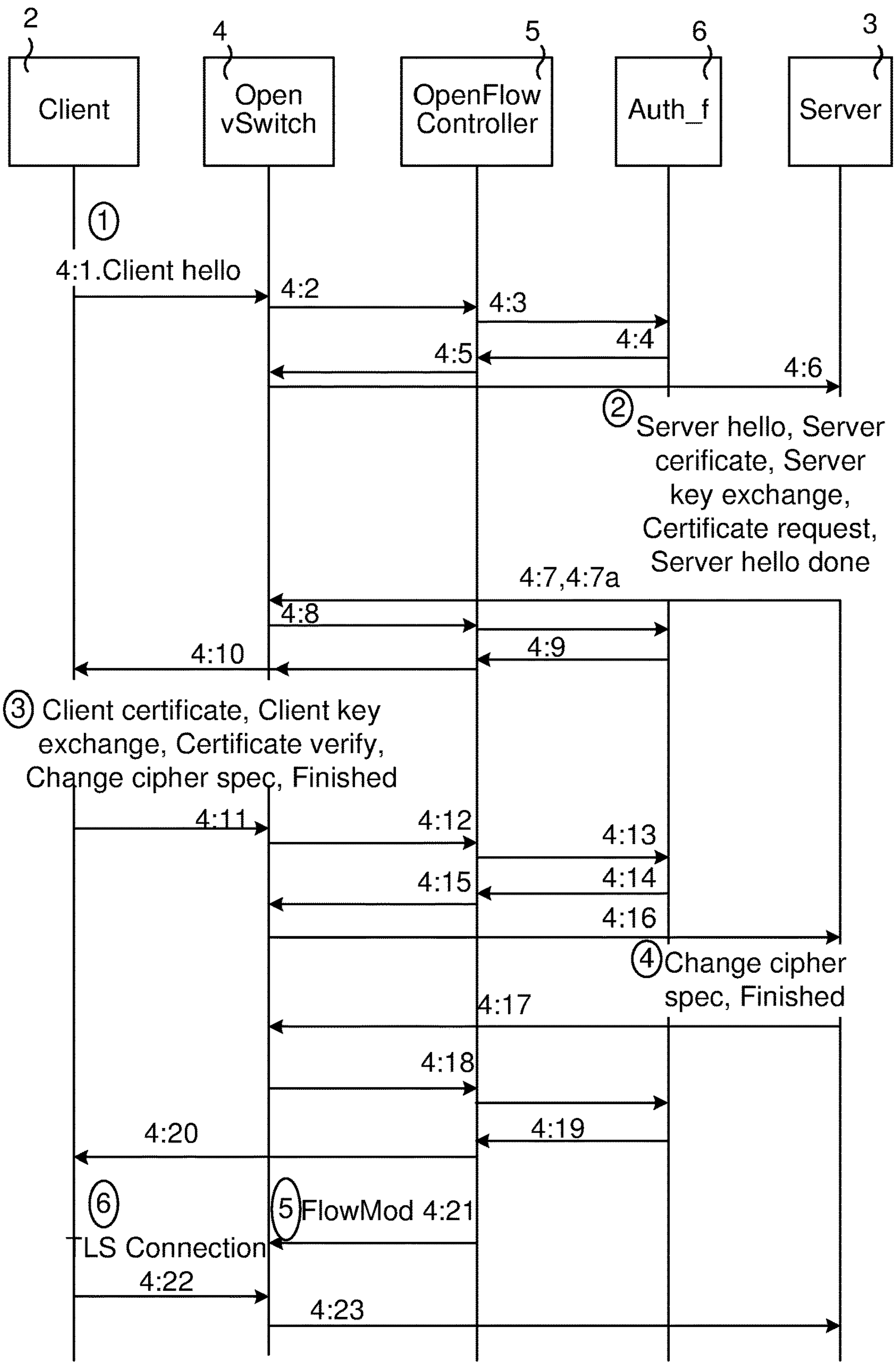
FIG. 4 is a sequence diagram illustrating an embodiment using TLS deep packet inspection.

FIG. 4 is a sequence diagram illustrating an embodiment using TLS. SSL/TLS is a pervasive protocol that is utilized in many different protocols, including HTTPS (HTTP over TLS/SSL or HTTP Secure) and many others. SSL/TLS also has a variant called datagram Transport Layer Security (dTLS), which operates in a similar way as TLS. dTLS is used for instance in Web Real-Time Communication (WebRTC) and securing sensors (e.g. in Constrained Application Protocol, CoAP). While TLS handles part of the negotiation using an encrypted channel, some of the initial negotiation parameters are in clear text, particularly when the client does not provide its own certificate. However, even when a client side certificate is used, this certificate may be verified, e.g., by checking it against black and/or white lists for approval of the client device.

Albeit the application data remains hidden from the intermediate nodes, the clear-text parameters in the control plane provide an opportunity for other type of inspection. Namely, the intermediate node may, for instance, inspect the two following properties of the key exchange:

1. Validity of a server-side certificate. For example, it is rather common that server-side certificates expire without the operators of the service noticing it. Here, the intermediate node 4 inspect the certificates of key exchanges and invokes action according to local policies. The policy may comprise notifying the owner of the service and/or block the connection with the invalid certificate.

2. Validity of the cryptographic ciphers. Client or server could be using outdated, or by local policy deemed unsatisfactory, cryptographic algorithms either because their software is not up-to-date or because an attacker could be trying to mount a downgrade attack on SSL/TLS. Again here, the intermediate nodes may scan the SSL/TLS handshake for cryptographic algorithms that do not conform to local policies. The action here may again be to drop the connection and/or notify the service owner.

Other properties could be checked as well, e.g. TLS version.

FIG. 4 illustrates an example of TLS handshake based on verification by OpenFlow controller 5 (denoted controller device 5 in the following). Similar to the SIP use case described with reference to FIG. 3, policy enforcement in box 6 (denoted "Auth_f" in the figure) may be logically decoupled from the controller device 5, or the functionality may be integrated into the controller device 5.

Summarized: the signaling starts at step 1 (encircled 1), the server 3 certificate verification is enforced during step 2 (encircled 2), client side cipher verification is enforced during step 3 (encircled 3), and server side in step 4 (encircled 4). In the following, various steps of the SSL/TLS handshake of FIG. 4 are described in more detail.

Step 1 (encircled 1): The client 2 initiates communication by sending a Client_Hello message to the server 3 (arrow 4:1). This Client_Hello message comprises for instance information such as session identifier and cryptographic algorithms supported by the client 2. The Client_Hello message is intercepted by an intermediate node, in this case illustrated by the Open vSwitch 4 (in the following denoted switch 4), and forwarded to the controller device 5 as a packet-in request (arrow 4:2). The controller device 5 verifies the request with the Auth_f service 6 (arrows 4:3 and 4:4). If the verification is successful the controller device 5 sends a packet-out message to the switch (arrow 4:5), which forwards the message to the server 3 (arrow 4:6).

Step 2 (encircled 2): The server 3 sends a Server_Hello message (arrow 4:7) to the client 2 in response to the client request, which message is intercepted by the switch 4. The switch 4 performs the authentication check with the controller device 5 (arrow 4:8), which does the authorization check with the Auth_f service 6 (arrows 4:9). The switch 4 then sends the Server_Hello message to the client 2 (arrow 4:10). Subsequently, the server 3 sends its certificate and a Server_Key_Exchange message (arrow 4:7*a*). The Key_Exchange is an optional message and it may be sent if the server's certificate does not have enough information for computing a pre-master secret by the client 2. Moreover, the server 3 may request the certificate of the client 2. Lastly, the server 3 sends the Server_Hello_Done to imply the end of the Server_Hello and related messages. The controller device 5 receives these messages and forwards them to the requested client 2. The controller device 5 may be arranged to check parameters of these messages.

Step 3 (encircled 3): The server 3 may have requested the certificate of the client 2 in step 2. As a result, the client 2 forwards its certificate to the server 3 (arrow 4:11). It is noted that usually client-side certificates are not used. Additionally, the client 2 always (or at least in most cases) sends the Client_Key_Exchange message to the server 3. This message includes a pre-master secret calculated by the client 2 based on the server's public key. Afterward, the Certificate_Verify message is sent for the verification of the client's certificate (if the certificate has been requested). Furthermore, the client 2 sends a Change_Cipher_Spec to indicate that further communications after the "Finished" message will be encrypted with the negotiated parameters. Subsequently, the controller device 5 receives these messages (arrow 4:12) and verifies the certificate of the client 2, as well as the selected security parameters, with the Auth_f service 6 (arrows 4:13, 4:14). After verification, the message is forwarded from the controller device 5 to the switch 4 (arrow 4:15) and from the switch 4 to the server 3 (arrow 4:16).

Step 4 (encircled 4): Similar to the client 2, the server 3 sends a Change_Cipher_Spec message to the client 2, the message is intercepted by the switch 4 (arrow 17), to indicate that the further communications after the Finish message from the server 3 will be encrypted based on the negotiated parameters, which again are verified by the controller/Auth_f service 6 (arrows 4:18, 4:19). Afterward, the controller device 5 forwards these messages to the relevant client 2 (arrow 4:20).

Step 5 (encircled 5): In this case, the controller device 5 installs a forwarding rule on the switch 4 with Flow_Mod messages (arrow 4:21) to accept further communication between the client 2 and the server 3. These messages are sent to all intermediate nodes along the path between the client 2 and the server 3 (refer to FIG. 1, illustrating several intermediate nodes located along the path between the client 2 and the server 3, and which would all receive the Flow_Mod message).

Step 6 (encircled 6): The client 2 makes directly an encrypted connection with the server 3 (arrows 4:22, 4:23). That is, no more messages are diverted to the controller device 5 for this particular flow.

Figure 5:
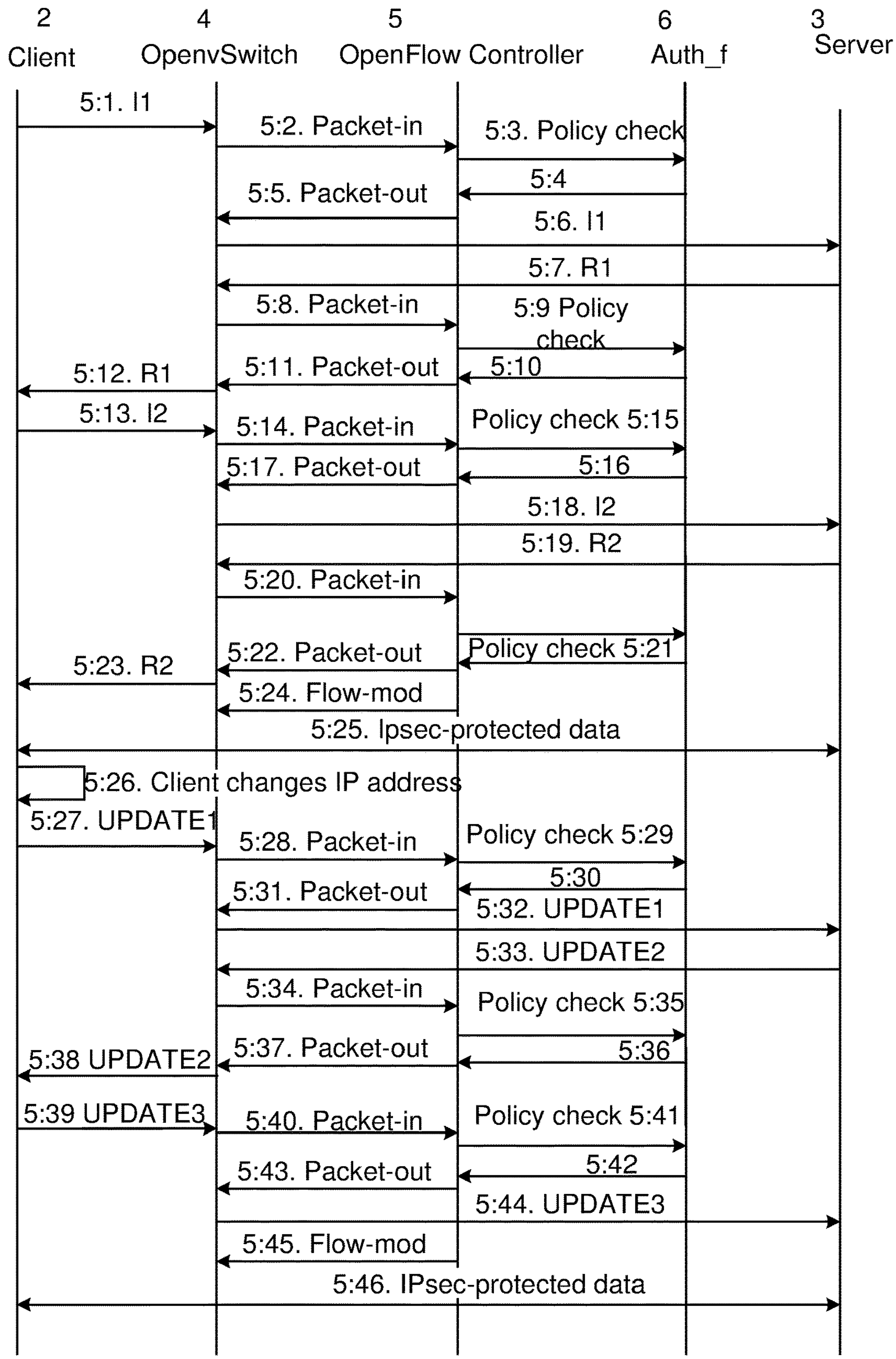
FIG. 5 is a sequence diagram illustrating an embodiment in HIP.

FIG. 5 is a sequence diagram illustrating an embodiment in Host Identity Protocol (HIP). The third exemplary use case illustrating the present teachings is for HIP, which is basically an IPsec-based VPN protocol (without any gateways) supporting also mobility management and strong authentication of end-hosts. The protocol has been standardized, and may also be used as a key exchange protocol for wireless personal area networks.

A base exchange comprises an initial key exchange in HIP), which is a four-packet Diffie-Hellman key exchange based on public-key authentication. During the key exchange, HIP derives key for an IPsec tunnel that will be used for protecting application-layer traffic. Further, HIP mobility extensions on how HIP-based VPN connections can survive address changes are defined and standardized. In contrast to SSL/TLS, all parameters for the HIP control plane are intentionally in clear text. In the case of HIP, essentially the same approach as with SIP (described with reference to FIG. 3) may be used. The controller device 5 inspects the traffic for public keys and certificates of the client 2 and server 3. Based on this information, the controller device 5 can essentially create a "distributed" firewall for HIP using the switches and routers of the SDN system 1.

In some more detail, the base exchange comprises packets I1, R2, I2 and R2. The first packet (I1) is a trigger packet that indicates that the client 2 (or "Initiator" in HIP terminology) wishes to communicate with the server 3 (or "Responder" in HIP terminology) over HIP. The I1 packet also comprises some information on cryptographic algorithms supported by the client 2. The I1 packet is unprotected, but all the following packets are signed with public-key signatures and hash message authentication codes. The next message, R1, includes Diffie-Hellman keying material and the public key of the server 3. The following message, I2, also includes the Diffie-Hellman keying material and the public key of the client 2. The last message R2 confirms that the server has approved the key exchange.

All described packets include a hash of the public (Host Identity Tag, HIT) of both the client 2 and the server 3 to clearly distinguish the source and destination endpoint. Here it is assumed that all HIP-based and IPsec-based communication is tunneled over UDP for Network Address Translation (NAT) traversal purposes. Next, the base exchange scenario is described step-by-step.

At arrow 5:1, the client 2 triggers the key exchange with an I1 packet. The packet is routed to a switch 4 (denoted "OpenvSwitch" in the figure) that has no state for the UDP encapsulated HIP flow, so it forwards the packet to the controller device 5 (denoted OpenFlow controller in the figure) (arrow 5:2). The controller device 5 checks cryptographic algorithms, signature and the HITs of the end-hosts by requesting from the Auth_f service 6 (arrow 5:3). Here it is assumed that the Auth_f service 6 approves the I1 packet (arrow 5:4), so the controller device 5 permits the packet (arrow 5:5), and the switch 4 finally delivers the I1 packet to the server 2 (arrow 5:6).

At arrow 5:7, the server 3 replies to the client 2 with an R1 packet. It is routed to the switch 4 that requests the controller device 5 to approve the packet (arrow 5:8). The controller device 5 verifies the used algorithms, signature and the public key of the server 3 from the Auth_f service 6 (arrow 5:9). Here, it is assumed that the Auth_f service 6 approves the R1 packet (arrow 5:10) and the controller device 5 further approves the packet (arrow 5:11) to the switch 4. The switch 4 finally routes the R1 packet towards the initiator (arrow 5:12).

Arrows 5:13-5:18 deal with the I2 packet and are handled similarly as the I1 case; the I2 packet is sent from the client 2 to the server 3, intercepted by the switch 4 (arrow 5:12), which forwards it to the controller device 5 for verification (arrow 5:14). The controller device 5 checks the packet with the Auth_f service 6 (arrows 5:9, 5:10), and sends a packet out to the switch 4 (arrow 5:11), which forwards the I2 packet to the server 3 (arrow 5:18). However, the controller device 5 can now check the public key of the initiator and also the public key signature.

Arrows 5:19-5:23 show the processing path of the R2 packet and are handled similarly as the R1 case. The difference here is that the public key of the server is not included in the packet, so the controller device 5 can only inspect the HITs and signature. The R2 packet concludes the key exchange, so the controller device 5 commands the switch 4 to approve the entire flow in a Flow-mod message (arrow 5:24), so that the client 2 and server 3 can continue to communicate over IPsec without intervention from the controller device (arrow 5:25).

Next, the mobility management procedure is described that occurs when the client 2 (or server 3) changes its network location (e.g. switches from 4G to WiFi).

At arrow 5:26, the client 2 changes its IP address, so it must inform the server 3 of its new whereabouts. The client 2 sends an UPDATE1 message to the server 3 (arrow 5:27), and the packet comprising the message arrives at the switch 4. From the viewpoint of the switch 4, the packet is a new flow because the IP address (and possibly different UDP port) is different, so it sends the packet to the controller device 5 (arrow 5:28). Next, at arrow 5:29, the controller device 5 asks the Auth_f service 6 to verify the packet details (signature, new IP addresses included in the message) and the controller device 5 accepts the packet (arrow 5:30). The controller device 5 further approves the packet with the switch 4 (arrow 5:31). Finally, the switch 4 routes the packet towards the server 3 (arrow 5:32).

Here, a mapping may be done of the packet to a possibly existing flow between the endpoints (by checking the source and destination HITs of mobility-related control messages). If there is an existing flow that has already been verified, then a reduced number of checks may be accomplished, although at the cost of reduced security. If there is no pre-existing information on a flow between the endpoints, then the update exchange should preferably be examined.

Arrows 5:33-5:38 describe the process of handling the UPDATE2 packet from the server, and arrows 5:39-44 describe the processing of UPDATE3 packet. In UPDATE2 packet, the server 3 triggers a so called return routability check to verify that the client 2 is really located at its claimed location. The UPDATE2 packet is intercepted by the switch 4 (arrow 5:33), which forwards it to the controller device 5 for verification (arrow 5:34). The controller device 5 checks the packet with the Auth_f service 6 (arrows 5:35, 5:36), and sends a packet out message to the switch 4 (arrow 5:37), which forwards the UPDATE2 packet to the client 2 (arrow 5:38). The client 2 responds with UPDATE3 packet to verify its location (arrow 5:39). The UPDATE3 message is intercepted and checked (arrows 5:40-5:43), and sent to the server 3 (arrow 5:44).

The UPDATE3 packet concludes the message exchange, so the controller device 5 commands the switch 4 to approve the entire flow in a Flow-mod message (arrow 5:45), so that the client 2 and server 3 can continue to communicate over IPsec without intervention from the controller device (arrow 5:46).

However, it is noted that as the UPDATE1 packet may include some additional locators, the UPDATE2 and UPDATE3 messaging may be repeated multiple times. Each new UPDATE2-UPDATE3 exchange will be a new flow from the viewpoint of the switch 4, but the controller device 5 can associate the new flows with the base exchange state established earlier based on the HITs in the messages. It is noted that the controller device 5 also checks the public-key signatures in the messages.

As a performance optimization, the controller device 5 may exclude checking public key signatures at the expense of lowered security. To improve security for the data plane (IPsec), the controller device 5 and/or the Auth_f service 6 may also keep track of the IPsec related information (security parameter index) in the key exchange and UPDATE messages. New and old security parameter index values are communicated in the UPDATE messages and can be used for mapping the update exchange to an existing HIP session, based on both HITs and security parameter index values used in the base exchange.

In common for all described use cases is that the switch 4 may expire the flow state based on soft state, i.e., when the flow has been idle for some time period.

Figure 6:
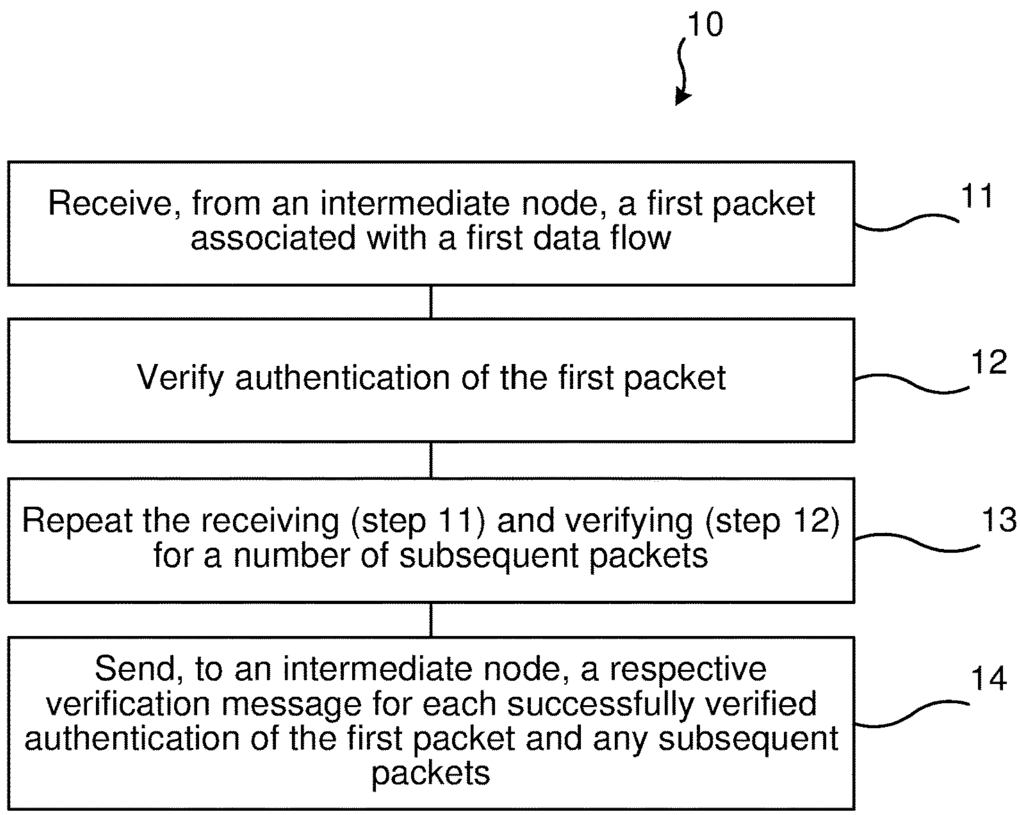
FIG. 6 illustrates a flow chart over steps of a method in a controller device in accordance with the present teachings.

The features and embodiments of the present teachings that have been described may be combined in different ways, examples of which are given in the following, with reference first to FIG. 6. FIG. 6 illustrates a flow chart over steps of a method in a controller device in accordance with the present teachings.

A method 10 is provided for access control of a data flow in a software defined networking system 1. The method 10 may be performed in a controller device 5 of the software defined networking system 1 and comprises receiving 11, from an intermediate node 4, 4*a*, a first packet (a packet for authentication verification) associated with a first data flow between a client node 2 and a server node 3. The first packet may comprise, e.g., a control signaling packet.

The method 10 comprises verifying 12, based on flow attributes of the first packet, authentication of the first packet. The authentication may be verified in various ways, for instance by certificate verification, by identity verification and authorization or by verification of protocol parameters. The authentication verification may comprise verifying that flow parameters that are exchanged during a handshaking procedure between the client node 2 and the server node 3 to match a set of policies for the protocol at hand and/or policies set for the user and/or the server node 3/client node 2. Examples on flow parameters comprise for instance security parameters, identifiers of e.g. the client node 2, the user, the session etc.

The method 10 comprises repeating 13 the receiving 11 and verifying 12 for a number of subsequent packets of the first data flow. The number of subsequent packets may be set based on type of protocol used for the first data flow and/or based on a policy set in the controller device 5. For instance, the controller device 5 may have been preconfigured to receive and verify a number of k packets for a certain protocol, or it may have been configured with a policy comprising, e.g., a rule stating that a number n packets should be received and verified for a certain type of client node. Such policies may be set e.g. by an operator/owner of the software defined networking system 1.

The method 10 comprises sending 14, to an intermediate node 4*a*, 4 along a path of the first data flow, a respective verification message for each successfully verified authentication of the first packet and any subsequent packets, allowing the first packet and any subsequent packets of the first data flow for forwarding.

The method 10 provides an improved authentication by the fact that the data flow direction from the client to the server as well as the reverse data flow direction from the server to the client may be authenticated by a controller device on behalf of the intermediate nodes. An advantage of the method 10 is that only the controller device 5 needs to be configured with, e.g., a set of rules relating to which data flows to authenticate, instead of each and every intermediate node 4, 4*a*, 4*i* of the software defined networking system 1.

In an embodiment, the method 10 comprises instructing intermediate nodes 4, 4*i*, 4*a* along the path of the first data flow to accept all subsequent packets associated with the first data flow. Once a data flow has been authenticated in a sufficient way, the intermediate nodes 4, 4*a*, 4*i* may pass all packets of that data flow without diverting them for authentication verification.

The controller device 5 may listen to, e.g., the control signaling between the client node 2 and the server node 3 until it has learned enough about the session and its parameters to make a decision whether the flow is authorized or not, but up until that point it only issues acceptance for each control message individually. Depending e.g. on the used protocol (SIP, HIP, TLS etc.), the amount of signaling and message verification that is needed in order to allow a flow may vary.

In an embodiment, the method 10 comprises:

- receiving, from the intermediate node 4, 4*a*, a second packet associated with a second data flow,
- establishing that the second data flow is related to the first data flow, and
- verifying, in response to the establishing, authentication of the second packet,
- repeating the receiving and verifying for a number of subsequent packets of the data flow, wherein the number of subsequent packets is set based on type of protocol used for the second data flow and/or a policy set in the controller device 5, and
- sending, to an intermediate node 4*a*, 4 along a path of the second data flow, a respective verification message for each successfully verified authentication of the second packet and any subsequent packets, allowing the second packet and any subsequent packets of the second data flow for forwarding.

For instance, it may happen that the client node 2 moves during an ongoing session, i.e. changes its topological location in the software defined networking system 1, but maintains the connectivity to the server node 3. The establishing may be performed in different ways depending on the protocol at hand. When the controller device 5 receives a new data flow it may thus check if it is related to another existing flow.

For instance, in case of mobility of the endpoint nodes, i.e. if either the server node or the client node (or both) have changed topological location in the software defined networking system but maintains connectivity, then it may be established that a new data flow between them is related to an already existing data flow. The establishing may comprise checking if both data flows have the same identifiers for the respective endpoint nodes. For instance, for HIP the controller device 5 may establish that the second data flow is related to the first data flow by examining source HITs and destination HITs of a mobility related control message. As another example, for SIP, the controller device 5 may use URIs as identifiers and/or call-IDs.

In an embodiment, the method 10 comprises establishing the client node 2 to be a trusted client node and reducing, in response thereto, a level of authentication verification required. The level of authentication verification that may be required for a certain client node may for instance be set based on the number of subsequent packets for verifying, e.g. using a smaller number of packets (and hence reduced level of authentication verification) for the trusted client node compared to, e.g., untrusted client node. As another example, the level may be set based on same number of packets for all clients, but less attributes may be checked per flow or per packet for trusted client nodes, than for untrusted client nodes.

In an embodiment, the receiving 11 comprises receiving the first packet from an intermediate node 4, 4*a* along the path of the data flow closest to the node 2, 3 that initiating the data flow and the sending 14 comprises sending the first verification message to an intermediate node 4*a*, 4 along the path of the data flow closest to the node 3, 2 receiving the data flow, bypassing any other intermediate node 4*i* along the path. It may, but need not, be the same intermediate node that sends a packet that also receives a verification message for the packet.

In various embodiments, the intermediate node 4 from which the first packet is received is different than the intermediate node 4*a* to which a corresponding verification message is sent. There may, for instance, be five different intermediate nodes along the path of the data flow. The intermediate node closest to one of the communicating parties (e.g. client node 2, sending party) may be the one that sends the first packet, which is received by the controller device 5. After the controller device 5 has authenticated the packet, the intermediate node to which the first verification message is sent may be the intermediate node closest to the other communicating party (e.g. the server node 3, the receiving party). The remaining three intermediate nodes of this example are thus bypassed, whereby a route optimization is achieved.

In an embodiment, the method 10 comprises:

receiving, from the intermediate node 4, 4*a*, a security token, verifying the security token, and sending, to the intermediate node 4, 4*a*, a verification message upon successfully verifying the security token.

Examples of the security token comprise a server security token, a client security token, a certificate, a digital signature, a password.

In a variation of the above embodiment, the method 10 comprises instructing the intermediate node 4, 4*a* to invoke an action according to a policy upon establishing the security token to be outdated. For instance, if the controller device 5 establishes that a security token, e.g. a certificate, is outdated, it may invoke an action such as notifying an operator of the SDN system 1 about the outdated certificate.

In an embodiment, the controller device 5 comprises a logically centralized network controller 5 of the software defined networking system 1, controlling each intermediate node 4 along the path from the client node 2 to the server node 3, and each intermediate node 4 along a communication path from the server node 3 to the client node 2. It is noted that the path from the client node 2 to the server node 3 may be different than the path from the server node 3 to the client node 2, i.e. the both paths may traverse different sets of intermediate nodes.

In an embodiment, the sending 14 comprises sending an instruction to block the data flow in case of the authentication of the first packet or any subsequent packet failing. This instruction may, for instance, be sent to a node closest to one of the communicating parties, preferably at the edge of the SDN system 1, whereby unauthorized data flows are dropped early.

In some embodiments, the method 10 may comprise sending, to the intermediate node 4, 4*a*, a timeout value for expiring a current state of the data flow upon reaching the timeout value.

Figure 7:
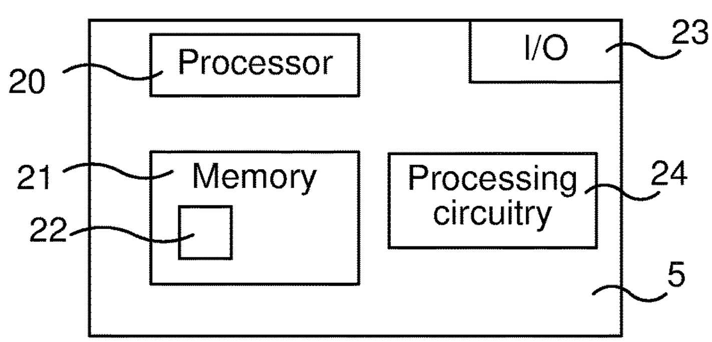
FIG. 7 illustrates schematically controller device and means for implementing embodiments of the present teachings.

FIG. 7 illustrates schematically controller device and means for implementing embodiments of the present teachings. The various embodiments of the method 10 as described, e.g., in relation to FIG. 6 may be implemented in a SDN system 1, and in particular a controller device 5 thereof.

The controller device 5 (also described with reference to FIG. 1) comprises a processor 20 comprising any combination of one or more of a central processing unit (CPU), multiprocessor, microcontroller, digital signal processor (DSP), application specific integrated circuit etc. capable of executing software instructions stored in a memory 21 which can thus be a computer program product 21. The processor 20 can be configured to execute any of the various embodiments of the method for instance as described in relation to FIG. 6.

The memory 21 can be any combination of read and write memory (RAM) and read only memory (ROM), Flash memory, magnetic tape, Compact Disc (CD)-ROM, digital versatile disc (DVD), Blu-ray disc etc. The memory 21 also comprises persistent storage, which, for example, can be any single one or combination of magnetic memory, optical memory, solid state memory or even remotely mounted memory.

The controller device 5 may also comprise an input/output device 23 (indicated by I/O in FIG. 7) for communicating with other entities. Such input/output device 23 may for instance comprise a communication interface. The input/output device 23 may in other instances be a wired connection to an intermediate node of SDN system 1.

The present teachings provide computer programs 22 for the controller device 5. The computer programs 22 comprises computer program code, which, when executed on at least one processor 20 on the controller device 5 causes the controller device 5 to perform the method 10 according to any of the described embodiments thereof.

The present disclosure also encompasses computer program products 21 comprising a computer program 22 for implementing the embodiments of the method as described, and a computer readable means on which the computer program 22 is stored. The computer program product 21 may, as mentioned earlier, be any combination of random access memory (RAM) or read only memory (ROM), Flash memory, magnetic tape, Compact Disc (CD)-ROM, digital versatile disc (DVD), Blu-ray disc etc.

A controller device 5 for access control of a data flow in a software defined networking system 1 is provided. The controller device 5 is configured to:

receive, from an intermediate node 4, 4*a*, a first packet associated with a first data flow between a client node 2 and a server node 3, verify, based on flow attributes of the first packet, authentication of the first packet, repeat the receiving 11 and verifying 12 for a number of subsequent packets of the first data flow, wherein the number of subsequent packets is set based on type of protocol used for the first data flow and/or a policy set in the controller device 5, and send, to an intermediate node 4*a*, 4 along a path of the first data flow, a respective verification message for each successfully verified authentication of the first packet and any subsequent packets, allowing the first packet and any subsequent packets of the first data flow for forwarding.

The controller device 5 may be configured to perform the above steps e.g. by comprising a processor 20 and memory 21, the memory 21 containing instructions executable by the processor 20, whereby the controller device 5 is operative to perform the steps.

In an embodiment, the controller device 5 is configured to instruct intermediate nodes 4, 4*i*, 4*a* along the path of the first data flow to accept all subsequent packets associated with the first data flow.

In an embodiment, the controller device 5 is configured to:

receive, from the intermediate node 4, 4*a*, a second packet associated with a second data flow, establish that the second data flow is related to the first data flow, verify, in response to the establishing, authentication of the second packet, repeat the receiving and verifying for a number of subsequent packets of the data flow, wherein the number of subsequent packets is set based on type of protocol used for the second data flow and/or a policy set in the controller device 5, and send, to an intermediate node 4*a*, 4 along a path of the second data flow, a respective verification message for each successfully verified authentication of the second packet and any subsequent packets, allowing the second packet and any subsequent packets of the second data flow for forwarding.

In an embodiment, the controller device 5 is configured to establish the client node 2 to be a trusted client node and to reduce, in response thereto, a level of authentication verification required.

In an embodiment, the controller device 5 is configured to receive by receiving the first packet from an intermediate node 4, 4*a* along the path of the data flow closest to the node 2, 3 initiating the data flow and configured to send 14 by sending the first verification message to an intermediate node 4*a*, 4 along the path of the data flow closest to the node 3, 2 receiving the data flow, bypassing any other intermediate node 4*i* along the path.

In an embodiment, the controller device 5 is configured to send a verification message to an intermediate node 4*a* different than the intermediate node 4 from which the first packet is received.

In an embodiment, the controller device 5 is configured to:

receive, from the intermediate node 4, 4*a*, a security token, verify the security token, and send, to the intermediate node 4, 4*a*, a verification message upon successfully verifying the security token.

In a variation of the above embodiment, the controller device 5 is configured to instruct the intermediate node 4, 4*a* to invoke an action according to a policy upon establishing the security token to be outdated.

In an embodiment, the controller device 5 comprises a logically centralized network controller 5 of the software defined networking system 1, controlling each intermediate node 4 along the path from the client node 2 to the server node 3, and each intermediate node 4 along a communication path from the server node 3 to the client node 2. It is noted that if one of the endpoints is located outside the SDN system 1, there could be non-SDN system 1 intermediate nodes on the path as well, which are not controlled by the controller device 5. However, such intermediate nodes would be transparent for the SDN system 1.

In an embodiment, the controller device 5 is configured to send an instruction to block the data flow in case of the authentication of the first packet or any subsequent packet failing.

The computer program products, or the memories, comprises instructions executable by the processor 20. Such instructions may be comprised in a computer program, or in one or more software modules or function modules.

In an aspect, means are provided, e.g. function modules, that can be implemented using software instructions such as computer program executing in a processor and/or using hardware, such as application specific integrated circuits, field programmable gate arrays, discrete logical components etc., or any combination thereof.

In particular, a controller device for access control of a data flow in a software defined networking system is provided. The controller device comprises first means for receiving, from an intermediate node, a first packet associated with a first data flow between a client node and a server node. Such first means may for instance comprise an input/output device as described earlier, e.g. a communication interface, and/or it may comprise any type of processing circuitry for receiving data.

The controller device comprises second means for verifying, based on flow attributes of the first packet, authentication of the first packet. Such second means may for instance comprise processing circuitry adapted to perform such verifying.

The controller device comprises third means for repeating the receiving and verifying for a number of subsequent packets of the first data flow, wherein the number of subsequent packets is set based on type of protocol used for the first data flow and/or a policy set in the controller device. Such third means may for instance comprise processing circuitry adapted for such repeating, e.g. using the first and second means mentioned.

The controller device comprises fourth means for sending, to an intermediate node along a path of the first data flow, a respective verification message for each successfully verified authentication of the first packet and any subsequent packets, allowing the first packet and any subsequent packets of the first data flow for forwarding. Such fourth means may for instance comprise an input/output device as described earlier, e.g. a communication interface, and/or it may comprise any type of processing circuitry for transmitting data.

Figure 8:
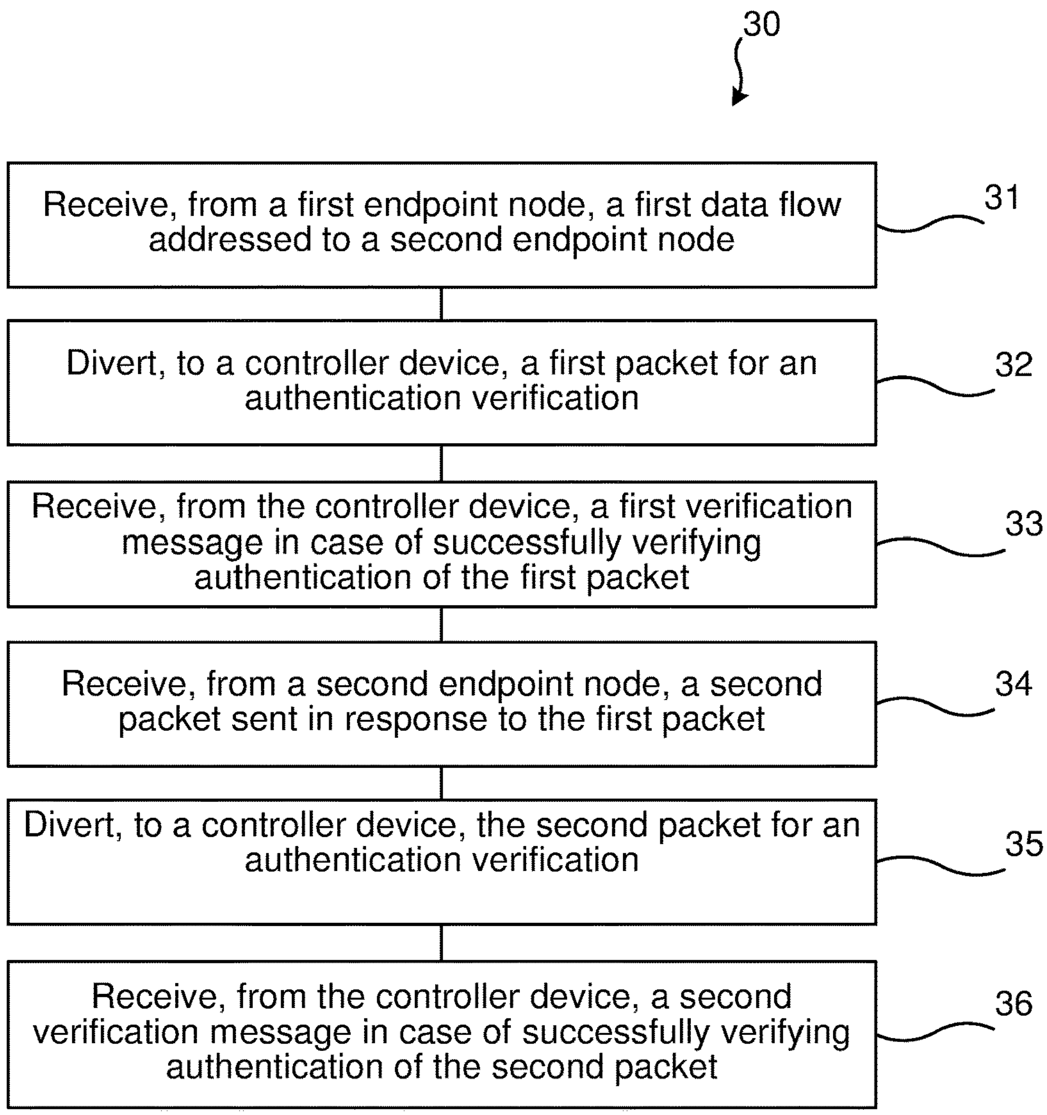
FIG. 8 illustrates a flow chart over steps of a method in an intermediate node in accordance with the present teachings.

FIG. 8 illustrates a flow chart over steps of a method in an intermediate node in accordance with the present teachings. A method 30 for authenticating a data flow in a software defined networking system is provided, which may be performed in an intermediate node 4. The method 30 comprises receiving 31 from a first endpoint node 2, 3, a first data flow addressed to a second endpoint node 3, 2. The first endpoint 2, 3 may for instance comprise a client node, and the second endpoint node 3, 2 a server node, or vice versa. The data flow may thus be initiated e.g. by a client node or by a server node.

The method 30 comprises diverting 32, to a controller device 5, a first packet for an authentication verification, the first packet being associated with the first data flow.

The method 30 comprises receiving 33, from the controller device 5, a first verification message in case of successfully verifying authentication of the first packet.

The method 30 comprises receiving 34, from the second endpoint node 3, 2, a second packet sent in response to the first packet.

The method 30 comprises diverting 35, to the controller device 5, the second packet for an authentication verification.

The method 30 comprises receiving 36, from the controller device 5, a second verification message verifying authentication of the second packet.

In an embodiment, the method 30 comprises repeating the receiving 31 and diverting 32 for a number of subsequent packets of the first data flow, wherein the number of subsequent packets is set based on type of protocol used for the first data flow and/or a policy set in the controller device 5.

In an embodiment, the method 30 comprises receiving, from the controller device 5, an instruction to accept all subsequent packets associated with the first data flow without diverting further packets for authentication verification. The instruction may for example comprise a rule for accepting the verified first data flow from a port of the intermediate node 4 to a port of the second endpoint node 3.

In various embodiments, the diverting 32 comprises diverting all control signaling messages of the data flow.

In an embodiment, the method 30 comprises:

receiving, from the first or second endpoint node 3, 2, a security token sending, to the controller device 5, the security token for verification thereof, and receiving, from the controller device 5, a verification message acknowledging verification of the security token.

In an embodiment, the receiving 33 comprises receiving an instruction to block the data flow in case of the authentication of the at least first packet failing.

In some embodiments, the method 30 comprises receiving, from the controller device 5, a timeout value for expiring a current state of the data flow upon reaching the timeout value.

Figure 9:
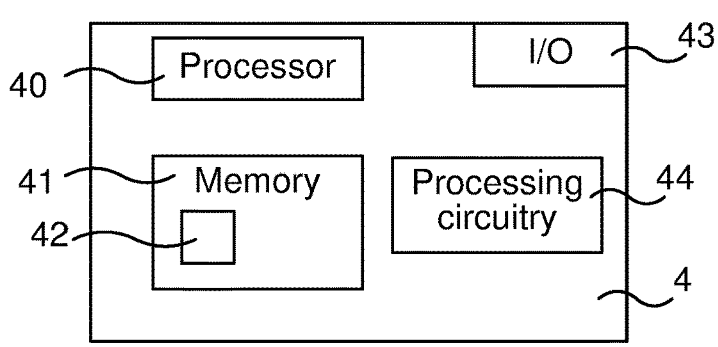
FIG. 9 illustrates schematically an intermediate node and means for implementing embodiments of the present teachings.

FIG. 9 illustrates schematically an intermediate node and means for implementing embodiments of the present teachings. The various embodiments of the method 30 as described e.g. in relation to FIG. 8 may be implemented in the SDN system 1, and in particular in an intermediate node thereof.

The intermediate node 4 comprises a processor 40 comprising any combination of one or more of a central processing unit (CPU), multiprocessor, microcontroller, digital signal processor (DSP), application specific integrated circuit etc. capable of executing software instructions stored in a memory 41 which can thus be a computer program product 41. The processor 40 can be configured to execute any of the various embodiments of the method for instance as described in relation to FIG. 8.

The memory 41 can be any combination of read and write memory (RAM) and read only memory (ROM), Flash memory, magnetic tape, Compact Disc (CD)-ROM, digital versatile disc (DVD), Blu-ray disc etc. The memory 41 also comprises persistent storage, which, for example, can be any single one or combination of magnetic memory, optical memory, solid state memory or even remotely mounted memory.

The intermediate node 4 may also comprise an input/output device 43 (indicated by I/O in FIG. 9) for communicating with other entities. Such input/output device 43 may for instance comprise a communication interface. The input/output device 43 may in other instances be a wired connection to an intermediate node of SDN system 1.

The present disclosure provides computer programs 42 for the intermediate node 4. The computer program s 42 comprises computer program code, which, when executed on at least one processor 40 on the intermediate node 4 causes the intermediate node 4 to perform the method 30 according to any of the described embodiments thereof.

The present disclosure also encompasses computer program products 41 comprising a computer program 42 for implementing the embodiments of the method as described, and a computer readable means on which the computer program 42 is stored. The computer program product 41 may, as mentioned earlier, be any combination of random access memory (RAM) or read only memory (ROM), Flash memory, magnetic tape, Compact Disc (CD)-ROM, digital versatile disc (DVD), Blu-ray disc etc.

An intermediate node 4 is provided for authenticating a data flow in a software defined networking system 1. The intermediate node 4 is configured to:

receive from a first endpoint node 2, 3, a first data flow addressed to a second endpoint node 3, 2, divert, to a controller device 5, a first packet for an authentication verification, the first packet being associated with the first data flow, receive, from the controller device 5, a first verification message in case of successfully verifying authentication of the first packet, and receive, from the second endpoint node 3, 2, a second packet sent in response to the first packet, divert, to the controller device 5, the second packet for an authentication verification, receive, from the controller device 5, a second verification message verifying authentication of the second packet.

The intermediate node 4 may be configured to perform the above steps e.g. by comprising a processor 40 and memory 41, the memory 41 containing instructions executable by the processor 40, whereby the intermediate node 4 is operative to perform the steps.

In an embodiment, the intermediate node 4 is configured to repeat the receiving and diverting for a number of subsequent packets of the first data flow, wherein the number of subsequent packets is set based on type of protocol used for the first data flow and/or a policy set in the controller device 5.

In an embodiment, the intermediate node 4 is configured to receive, from the controller device 5, an instruction to accept all subsequent packets associated with the first data flow without diverting further packets for authentication verification.

In an embodiment, the intermediate node 4 is configured to divert by diverting all control signaling messages of the data flow.

In an embodiment, the intermediate node 4 is configured to:

receive, from the first or second endpoint node 3, 2, a security token send, to the controller device 5, the security token for verification thereof, and receive, from the controller device 5, a verification message acknowledging verification of the security token.

In an embodiment, the intermediate node 4 is configured to receive by receiving an instruction to block the data flow in case of the authentication of the at least first packet failing.

The computer program products, or the memories, comprises instructions executable by the processor 20. Such instructions may be comprised in a computer program, or in one or more software modules or function modules.

In an aspect, means are provided, e.g. function modules, that can be implemented using software instructions such as computer program executing in a processor and/or using hardware, such as application specific integrated circuits, field programmable gate arrays, discrete logical components etc., or any combination thereof.

In particular, an intermediate node for authenticating a data flow in a software defined networking system is provided. The intermediate node comprises first means for receiving from a first endpoint node, a first data flow addressed to a second endpoint node. Such first means may for instance comprise an input/output device as described earlier, e.g. a communication interface, and/or it may comprise any type of processing circuitry for receiving data.

The intermediate node comprises second means for diverting, to a controller device, a first packet for an authentication verification, the first packet being associated with the first data flow. Such second means may for instance comprise processing circuitry adapted to perform such diverting.

The intermediate node comprises third means for receiving, from the controller device, a first verification message in case of successfully verifying authentication of the first packet. Such third means may for instance comprise an input/output device as described earlier, e.g. a communication interface, and/or it may comprise any type of processing circuitry for receiving data.

The intermediate node comprises fourth means for receiving, from the second endpoint node, a second packet sent in response to the first packet. Such fourth means may for instance comprise an input/output device as described earlier, e.g., a communication interface, and/or it may comprise any type of processing circuitry for receiving data.

The intermediate node comprises fifth means for diverting, to the controller device, the second packet for an authentication verification. Such fifth means may for instance comprise processing circuitry adapted to perform such diverting.

The intermediate node comprises sixth means for receiving, from the controller device, a second verification message verifying authentication of the second packet. Such sixth means may for instance comprise an input/output device as described earlier, e.g., a communication interface, and/or it may comprise any type of processing circuitry for receiving data.

It is noted that the fifth means and the second means may comprise similar or even same means. Correspondingly, the first, third, fourth and sixth means may comprise similar or even same means.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for access control of a data flow in a software defined networking system, the method being performed in a controller device and comprising:

receiving, from an intermediate node, a first packet associated with a first data flow between a client node and a server node, verifying, based on flow attributes of the first packet, authentication of the first packet, repeating the receiving and verifying for a number of subsequent packets of the first data flow, wherein the number of subsequent packets is set based on type of protocol used for the first data flow and/or a policy set in the controller device, and sending, to the intermediate node and/or to another intermediate node along a path of the first data flow, a respective verification message for each successfully verified authentication of the first packet and the number of subsequent packets, allowing the first packet and the number of subsequent packets of the first data flow for forwarding.

2. The method as claimed in claim 1, further comprising:

instructing intermediate nodes along the path of the first data flow to accept all subsequent packets associated with the first data flow.

3. A controller device for access control of a data flow in a software defined networking system, wherein the controller device comprises:

a processor; and memory storing instructions that, when executed by the processor, cause the controller device to:

receive, from an intermediate node, a first packet associated with a first data flow between a client node and a server node, verify, based on flow attributes of the first packet, authentication of the first packet, repeat the receiving and verifying for a number of subsequent packets of the first data flow, wherein the number of subsequent packets is set based on type of protocol used for the first data flow and/or a policy set in the controller device, and send, to the intermediate node and/or to another intermediate node along a path of the first data flow, a respective verification message for each successfully verified authentication of the first packet and the number of subsequent packets, allowing the first packet and the number of subsequent packets of the first data flow for forwarding.

4. The controller device as claimed in claim 3, wherein the memory further stores instructions that, when executed by the processor, cause the controller device to:

instruct intermediate nodes along the path of the first data flow to accept all subsequent packets associated with the first data flow.

5. The controller device as claimed in claim 3, wherein the memory further stores instructions that, when executed by the processor, cause the controller device to:

receive, from the intermediate node, a second packet associated with a second data flow, establish that the second data flow is related to the first data flow, verify, in response to the establishing, authentication of the second packet, repeat the receiving and verifying for a number of subsequent packets of the second data flow, wherein the number of subsequent packets is set based on type of protocol used for the second data flow and/or a policy set in the controller device, and send, to an intermediate node along a path of the second data flow, a respective verification message for each successfully verified authentication of the second packet and any subsequent packets, allowing the second packet and any subsequent packets of the second data flow for forwarding.

6. The controller device as claimed in claim 3, wherein the memory further stores instructions that, when executed by the processor, cause the controller device to:

determine that the client node is a trusted client node, and responsive to determining that the client node is a trusted client node, reduce a level of authentication required for verifying authentication to a reduced level of authentication, wherein the reduced level of authentication is based on the number of subsequent packets.

7. The controller device as claimed in claim 3, wherein receiving comprises receiving the first packet from an intermediate node along the path of the data flow closest to the node initiating the data flow and wherein sending comprises sending the first verification message to an intermediate node along the path of the data flow closest to the node receiving the data flow, bypassing any other intermediate node along the path.

8. The controller device as claimed in claim 3, wherein the memory further stores instructions that, when executed by the processor, cause the controller device to:

send a verification message to an intermediate node different than the intermediate node from which the first packet is received.

9. The controller device as claimed in claim 3, wherein the memory further stores instructions that, when executed by the processor, cause the controller device to:

receive, from the intermediate node, a security token, verify the security token, and send, to the intermediate node, a verification message upon successfully verifying the security token.

10. The controller device as claimed in claim 9, wherein the memory further stores instructions that, when executed by the processor, cause the controller device to:

instruct the intermediate node to invoke an action according to a policy upon establishing the security token to be outdated.

11. The controller device as claimed in claim 3, wherein the controller device comprises a logically centralized network controller of the software defined networking system, controlling each intermediate node along the path from the client node to the server node, and each intermediate node along a communication path from the server node to the client node.

12. The controller device as claimed in claim 3, wherein sending comprises sending an instruction to block the data flow in case of the authentication of the first packet or any subsequent packet failing.

13. A method for authenticating a data flow in a software defined networking system, the method being performed in an intermediate node and comprising:

receiving from a first endpoint node, a first data flow addressed to a second endpoint node, diverting, to a controller device, a first packet for an authentication verification, the first packet being associated with the first data flow, receiving, from the controller device, a first verification message in case of successfully verifying authentication of the first packet, receiving, from the second endpoint node, a second packet sent in response to the first packet, diverting, to the controller device, the second packet for an authentication verification, receiving, from the controller device, a second verification message verifying authentication of the second packet, and repeating the receiving and diverting for a number of subsequent packets of the first data flow, wherein the number of subsequent packets is set based on type of protocol used for the first data flow and/or a policy set in the controller device.

14. An intermediate node for authenticating a data flow in a software defined networking system, wherein the intermediate node comprises:

a processor; and memory storing instructions that, when executed by the processor, cause the controller device to:

receive from a first endpoint node, a first data flow addressed to a second endpoint node, divert, to a controller device, a first packet for an authentication verification, the first packet being associated with the first data flow, receive, from the controller device, a first verification message in case of successfully verifying authentication of the first packet, receive, from the second endpoint node, a second packet sent in response to the first packet, divert, to the controller device, the second packet for an authentication verification, receive, from the controller device, a second verification message verifying authentication of the second packet, and repeat the receiving and diverting for a number of subsequent packets of the first data flow, wherein the number of subsequent packets is set based on type of protocol used for the first data flow and/or a policy set in the controller device.

15. The intermediate node as claimed in claim 14, wherein the memory further stores instructions that, when executed by the processor, cause the intermediate node to:

receive, from the controller device, an instruction to accept all subsequent packets associated with the first data flow without diverting further packets for authentication verification.

16. The intermediate node as claimed in claim 14, wherein diverting comprises diverting all control signaling messages of the data flow.

17. The intermediate node as claimed in claim 14, the memory further stores instructions that, when executed by the processor, cause the intermediate node to:

receive, from the first or second endpoint node, a security token, send, to the controller device, the security token for verification thereof, and receive, from the controller device, a verification message acknowledging verification of the security token.

18. The intermediate node as claimed in claim 14, wherein receiving comprises receiving an instruction to block the data flow in case of the authentication of the at least first packet failing.

19. The method of claim 1 further comprising:

determining that the client node is a trusted client node, and responsive to determining that the client node is a trusted client node, reducing a level of authentication required for verifying authentication to a reduced level of authentication, wherein the reduced level of authentication is based on the number of subsequent packets.

* * * * *